(12) United States Patent
Motwani

(10) Patent No.: US 8,036,124 B1
(45) Date of Patent: Oct. 11, 2011

(54) EARLY LOAD DETECTION SYSTEM AND METHODS FOR GGSN PROCESSOR

(75) Inventor: Girish Motwani, Karnataka (IN)

(73) Assignee: Juniper Networks, Inc., Sunnyvale, CA (US)

( * ) Notice: Subject to any disclaimer, the term of this patent is extended or adjusted under 35 U.S.C. 154(b) by 552 days.

(21) Appl. No.: 11/673,236

(22) Filed: Feb. 9, 2007

(51) Int. Cl.
*H04L 1/00* (2006.01)
(52) U.S. Cl. ............... 370/235; 370/230; 370/230.1
(58) Field of Classification Search ........... 370/232, 370/230, 230.1, 235, 237
See application file for complete search history.

(56) References Cited

U.S. PATENT DOCUMENTS

| | | | |
|---|---|---|---|
| 6,920,120 B2 * | 7/2005 | Huang et al. | 370/329 |
| 6,996,062 B1 * | 2/2006 | Freed et al. | 370/235 |
| 7,197,564 B1 * | 3/2007 | Bhoj et al. | 709/225 |
| 7,286,485 B1 * | 10/2007 | Ouellette et al. | 370/252 |
| 7,720,063 B2 * | 5/2010 | Maiorana et al. | 370/389 |
| 2003/0014544 A1 * | 1/2003 | Pettey | 709/249 |
| 2005/0165932 A1 * | 7/2005 | Banerjee et al. | 709/226 |
| 2005/0201398 A1 * | 9/2005 | Naik et al. | 370/412 |

OTHER PUBLICATIONS

Sally Floyd and Van Jacobson, "Random Early Detection Gateways for Congestion Avoidance", Aug. 1993, IEEE.*
Floyd, S. et al., "Random Early Detection Gateways for Congestion Avoidance" IEEE/ACM Transactions on Networking, vol. 1, No. 4, Aug. 1993, pp. 397-413.

* cited by examiner

*Primary Examiner* — Huy Vu
*Assistant Examiner* — Omer Mian
(74) *Attorney, Agent, or Firm* — Harrity & Harrity, LLP

(57) ABSTRACT

A device may store a first and second queue of packets, calculate an average queue size based on the number of packets in the first and second queues and discard a packet when the packet is a session creation packet and the calculated average queue size is greater than a threshold value.

23 Claims, 6 Drawing Sheets

EARLY LOAD DETECTION SYSTEM AND METHODS FOR GGSN PROCESSOR

BACKGROUND OF THE INVENTION

Systems and methods described herein relate generally to wireless communications using a GGSN device, and more particularly, to early load detection within a GGSN device.

A General Packet Radio Service (GPRS) network provides mobile computing and telephony users with packet-switched connections to data networks through a gateway GPRS support node (GGSN) device. A GGSN device may process packets from subscribers already connected to a data network and may also process session creation packets received from mobile stations that may be in the process of creating a connection to a data network. Session creation packets require more processing by GGSN devices than data packets that transmit data via existing connections. GGSN devices may become overloaded and drop packets over existing data connections when a large number of session creation packets are received.

SUMMARY OF THE INVENTION

In accordance with one implementation a method is provided, the method comprises storing a first and second queue of packets; calculating an average queue size based on the number of packets in the first and second queue and discarding a packet when the packet is a session creation packet and the calculated average queue size is greater than a threshold value.

In another implementation, a method is provided, the method comprising: storing two queues of packets; calculating an average queue size of the two queues as $avg_c = \lfloor (1-w) \times avg_p \rfloor + (w \times q)$; where q is the number of packets remaining in the first and second queues and w is a queue filter time constant; comparing the calculated average queue size to a threshold value; and discarding a packet when the calculated average queue size exceeds the threshold value and the packet is determined to be a session creation packet.

In yet another implementation, a network device is provided, the network device including a first and second MAC processor; and a plurality of compute processors, wherein each of the compute processors are configured to: receive and store a first queue of packets from a first a MAC processor; receive and store a second queue of packets from a second MAC processor; dequeue a packet; calculate an average queue size based on the number of remaining packets in the stored first and second queues; compare the calculated average queue size to a threshold; determine if the dequeued packet is a session creation packet; and process the dequeued packet based on the calculated average queue size and whether the dequeued packet is a session creation packet.

BRIEF DESCRIPTION OF DRAWINGS

The accompanying drawings, which are incorporated in and constitute a part of this specification, illustrate an implementation of the invention and, together with the description, explain the invention. In the drawings.

DETAILED DESCRIPTION OF PREFERRED EMBODIMENTS

The following detailed description of the preferred embodiments refers to the accompanying drawings. The same reference numbers in different drawings may identify the same or similar elements. Also, the following detailed description does not limit the embodiments. Instead, the scope of the embodiments is defined by the appended claims and their equivalents.

System Overview

Figure 1:
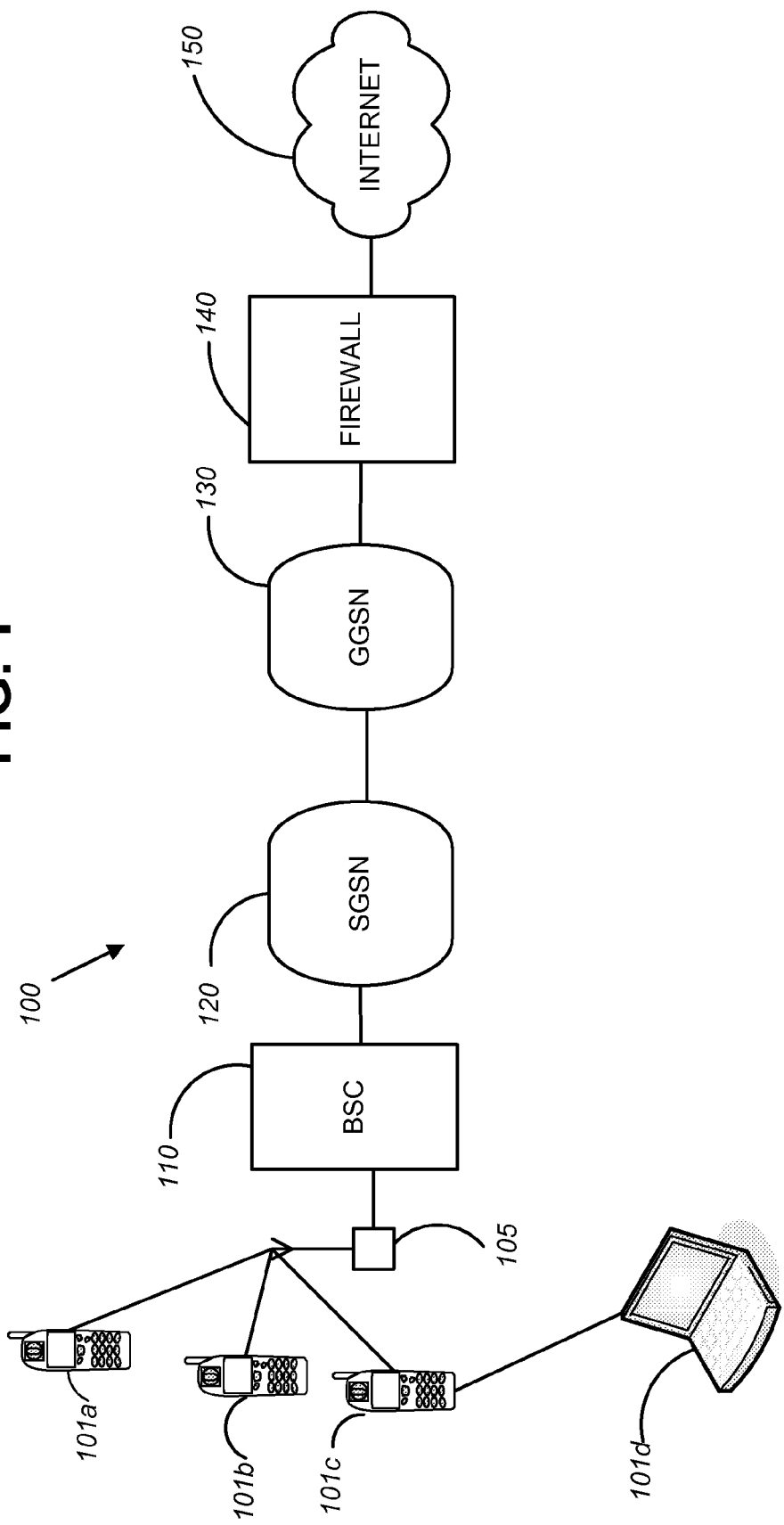
FIG. 1 is a block diagram illustrating an exemplary GPRS network for packet switched communications between a mobile station and a data network.

FIG. 1 illustrates an exemplary General Packet Radio Service (GPRS) network 100 that may be used to connect one or more mobile stations 101a-101d ("mobile stations 101") to a packet data network, such as the Internet 150. GPRS network 100 may include mobile stations 101, Base Transceiver Station (BTS) 105, Base Station Controller (BSC) 110, Serving GPRS Support Node (SSGN) 120, GGSN 130 and firewall 140, that may connect mobile stations 110 to Internet 150, for example. Information sent over GPRS network 100 may be broken up into packets that may include a header and a payload. The header may include instructions and information, such as error checking information, and source and destination addresses. The payload may include data that is to be delivered to the destination and may also include information to create a data session with Internet 150.

Mobile stations 101 may include one or more processors or microprocessors enabled by software programs to perform functions, such as data storage and transmission, and interfacing with networks, such as Internet 150. As used herein, the term "mobile stations" may include a cellular radiotelephone with or without a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver; and a conventional laptop and/or palmtop receiver or other appliance that includes a radiotelephone transceiver. Mobile stations 101 may also be referred to as "pervasive computing" devices that are capable of communicating with other devices such as other mobile stations 101. For example, mobile station 101d may communicate through mobile station 101c. Mobile stations 101 may also include a data storage memory, such as a random access memory (RAM) or another dynamic storage device that stores information. Mobile stations 101 may connect to SGSN 120 via BTS 105 and BSC 110, for example.

BTS 105 may receive/transmit radio signals to/from mobile stations 101. BTS 105 may also forward/receive signals to/from BSC 110. BTS 105 may contain hardware and software for transmitting and receiving radio signals to/from mobile stations 101 that may including baseband processing, radio equipment and an antenna.

BSC 110 may transmit and receive signals to/from BTS 105. BSC 110 may contain hardware and software for managing BTS 105 and may control frequency allocation and communications to/from BTS 105, for example. BSC 110 may also transmit and receive signals to SGSN 120.

SGSN 120 may include hardware and/or software that may receive communications from BSC 110 and may forward data packets that may be received from mobile stations 101 to GGSN 130. For example, when a subscriber wishes to access Internet 150, the subscriber may use one of mobile stations 101 to contact SGSN 120 (via BTS 105 and BSC 110) and the subscriber may be assigned an IP addresses from a pool that may be contained in SGSN 120. The assigned IP address is identified with the particular mobile station 101 and may be used in a packet header for all packets associated with the given subscriber. Once a mobile station 101 ends its connection, the IP address associated with the mobile station 101 may be returned to the IP address pool in SGSN 120 where the address may be reassigned to another mobile station 101. The incoming and outgoing packets may be assigned to the IP address in the packet header that corresponds to one of mobile stations 101 using the IP address at the time of transmission. Any number of routing/network components (not shown) may be interposed between the SGSN 120 and GGSN 130, for example.

GGSN 130 may include hardware and/or software that may receive encapsulated data packets from SGSN 120 and may perform further processing on the received data packets. For example, an encapsulated packet may be decapsulated and processed by GGSN 130, and then may be transmitted through Firewall 140 to Internet 150. GGSN 130 may also track a user's (mobile station 101) internet use and access patterns and may perform layer 3 to 7 packet inspection for processing as described below in FIGS. 2-6, for example.

Firewall 140 may filter packets sent to/from Internet 150 before allowing the packets to continue to/from GGSN 130. Firewall 140 may include devices and software that may separate networks. Firewall 140 may, for example, filter network traffic to forward legitimate traffic drop suspect traffic.

Internet 150 may include a data network such as Internet Protocol (IP) network, a public switched telephone network, such as the (PSTN), a metropolitan area network (MAN), a wide area network (WAN), a local area network (LAN), or a combination of networks. Internet 150 may also include devices such as switches, routers, firewalls, gateways, and/or servers (not shown) in order to transmit/receive and route data to/from other connected network devices. Internet 150 may be a hardwired network using wired conductors and/or optical fibers and/or may be a wireless network using free-space optical and/or radio frequency (RF) transmission paths. Implementations of Internet 150 and/or devices operating on Internet 150 described herein are not limited to any particular data type, and/or protocol.

Figure 2:
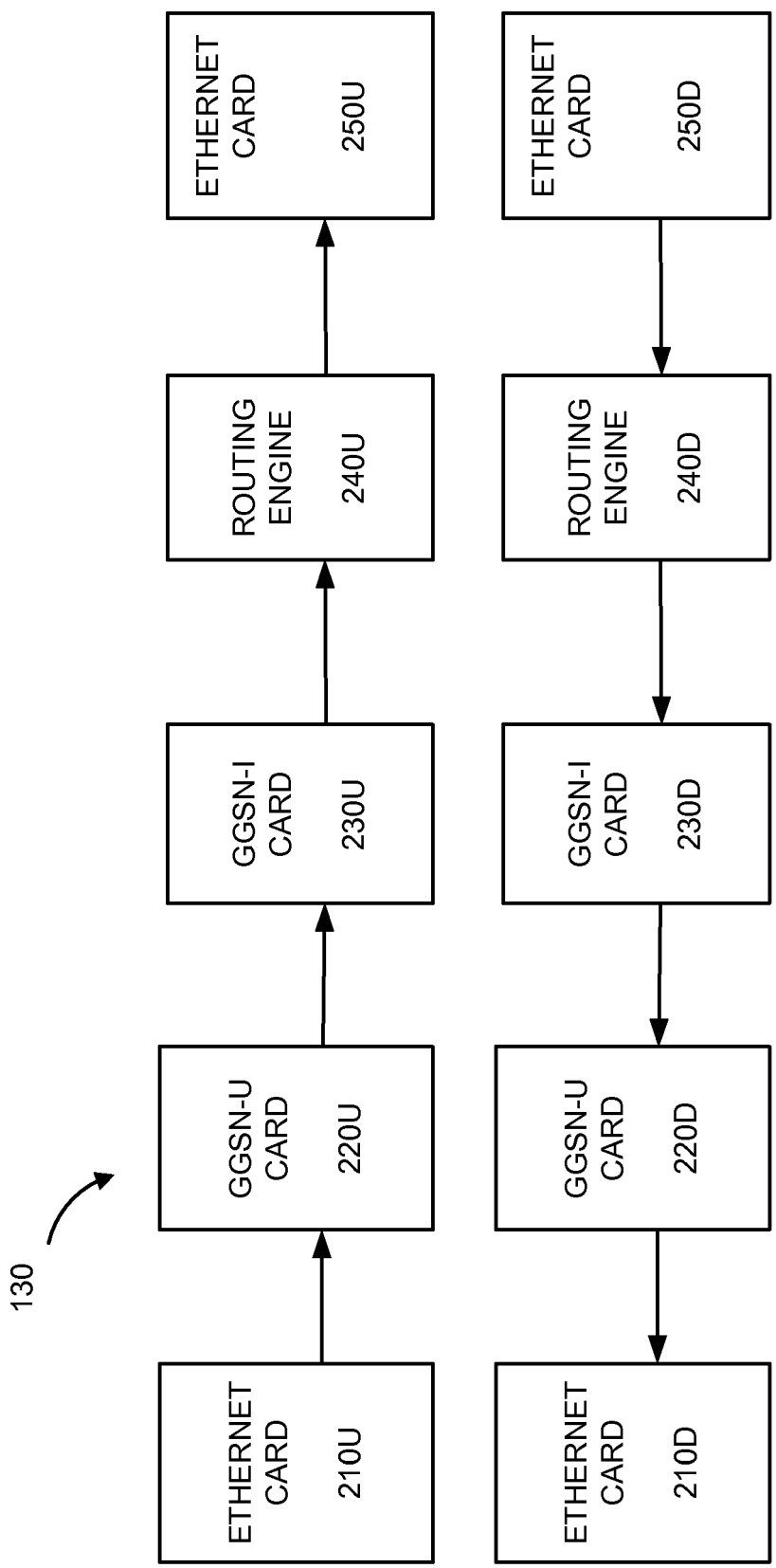
FIG. 2 is a block diagram illustrating an exemplary packet flow through a GGSN node.

FIG. 2 shows an exemplary GGSN device 130. GGSN device 130 may include an Ethernet card 210, a GGSN-U card 220, a GGSN-I card 230, a routing engine 240 and an Ethernet card 250, for example. In this exemplary embodiment, both upstream (from mobile stations 101) and downstream (to mobile stations 101) links of GGSN 130 may both contain devices 210-250, where upstream devices are identified with "U" and downstream devices are identified by "D," following the reference number.

Ethernet card 210 may include hardware and/or software that may interface with SGSN 120. For example, Ethernet card 210 may receive packets from SGSN 120 destined for Internet 150 (uplink), and may transmit data packets from GSGN 130 to SGSN 120 destined for a mobile station 101 (downlink).

GGSN-U card 220 may include hardware and/or software that may receive encapsulated data packets from Ethernet card 210 and may decapsulate the received packets for further processing and forwarding to Internet 150. GGSN-U card 220 may also gather user statistical information relating to the volume of data transmitted to/from a mobile station 101, and may also enforce downlink bandwidth requirements, for example.

GGSN-I card 230 may include hardware and/or software that may receive and process data packets. For example, GGSN-I card 230 may perform layer 3 to 7 packet inspection to compute charging information based on user's internet access patterns and service provider configuration. GGSN-I card may also process packets and determine if a packet contains session creation information, for example.

Routing engine 240 may include hardware and/or software that may receive and route data packets. For example, routing engine 240 may perform routing of packets based on addressing information contained in a packet header, in both the upstream and downstream directions.

Ethernet card 250 may include hardware and/or software that may interface with Internet 150. For example, Ethernet card 250 may receive packets from routing engine 240 destined for Internet 150 (uplink), and may transmit data packets from Internet 150 to GGSN 130 destined for a mobile station 101 (downlink).

Figure 3:
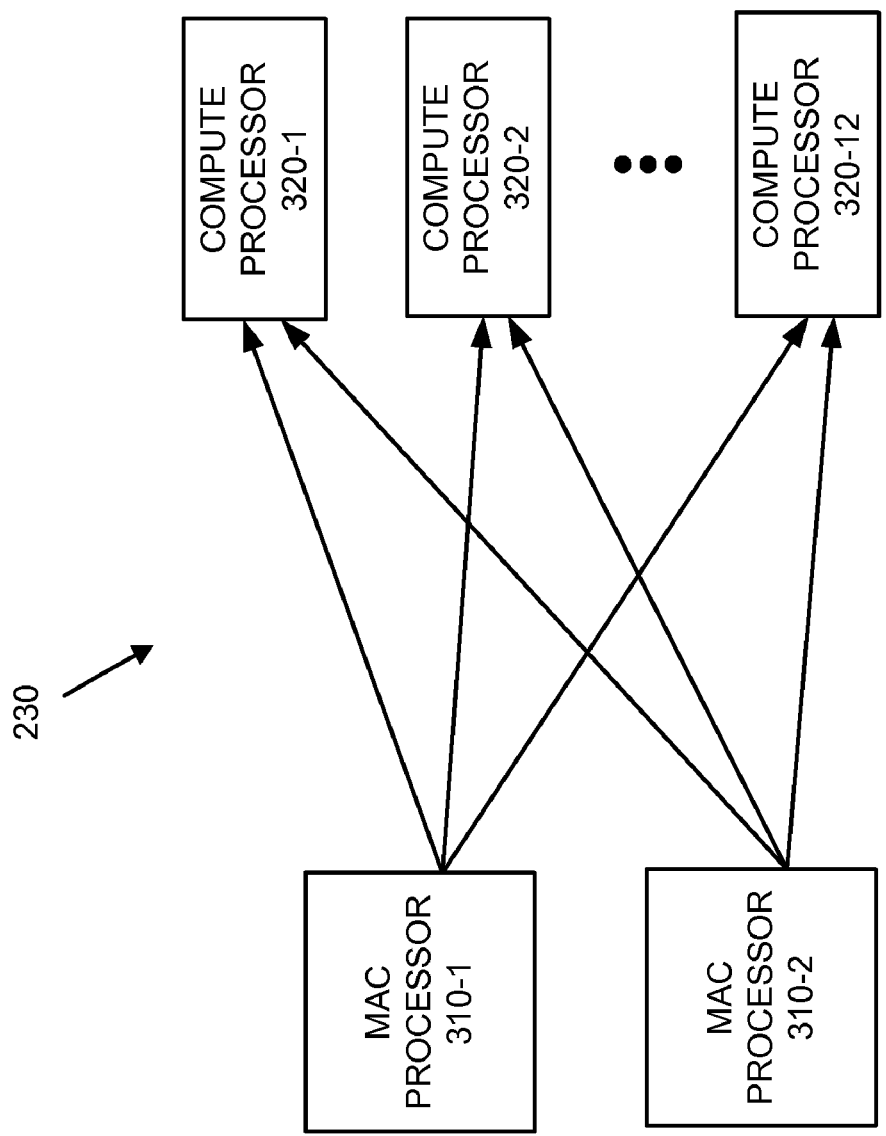
FIG. 3 is a block diagram illustrating an exemplary GGSN-I card.

FIG. 3 shows a block diagram of an exemplary GGSN-I card 230. GGSN-I card 230 may include two MAC processors 310-1 and 310-2 (collectively referred to as MAC processors 310) and twelve compute processors 320-1, 320-2, ... 320-12, (collectively referred to as compute processors 320).

MAC processors 310 may each include multiple packet forwarding engines that may forward packets to compute processors 320. MAC processor 310 may receive packets from GGSN-U card 230. MAC processor 310 may perform routing of packets based on computed hash values from packet header information to determine a destination compute processor 320.

Compute processors 320 may include hardware and/or software that may receive queues of data packets from MAC processors 310. For example, each compute processor 320 may contain a memory for storing queues of data packets and may contain logic for processing the stored packets. For example, each compute processor 320 may include hardware and/or software that may determine the amount of data packets stored in the queues in memory, may detect the contents of the data packets, and may further process or discard the data packets based on a calculated average queue size and the packet contents.

Figure 4:
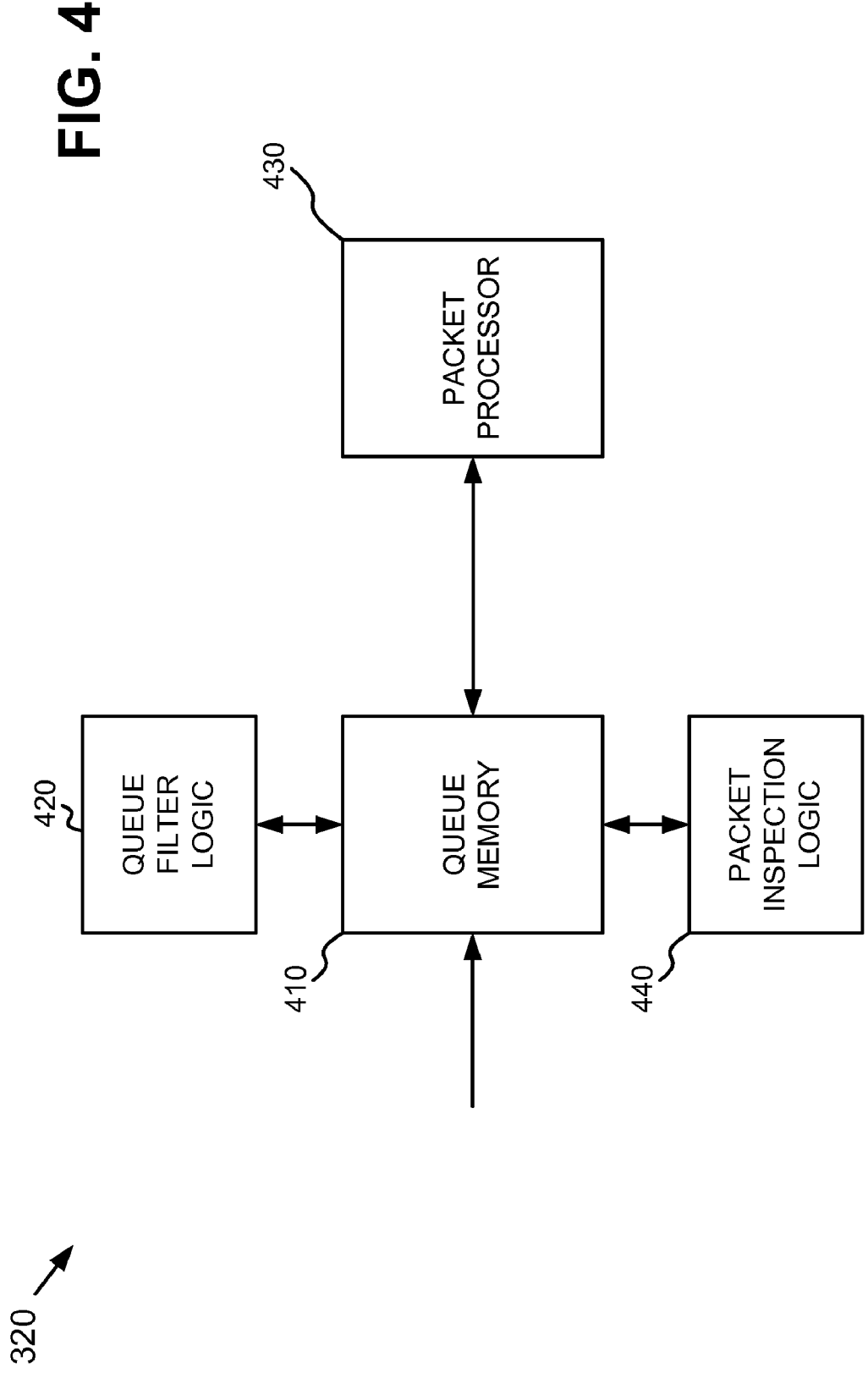
FIG. 4 is a block diagram illustrating an exemplary compute processor.

FIG. 4 shows a block diagram of an exemplary compute processor 320. Compute processors 320 may include, for example, a queue memory 410, queue filter logic 420, packet processor 430 and packet inspection logic 440.

Queue memory 410 may include a random access memory (RAM) or another dynamic storage device that stores queues of data packets containing headers and information. Queue memory may store and receive groups of packets from MAC processors 310-1 and 310-2. Queue memory 410 may also be used to store temporary variables or other intermediate information during execution of instructions by packet processor 430.

Queue filter logic 420 may include hardware and/or software that may calculate average queue sizes. For example, queue filter logic 420 may track or monitor a number of packets in two stored queues (one received from MAC processor 310-1 and one received from MAC processor 310-2) in queue memory 410. Queue filter logic 420 may also store parameters necessary for performing calculations to determine an average queue size as described below.

Packet processor 430 may include hardware and software to dequeue and process packets from the queue memory 410. For example, packet processor 430 may dequeue a packet in a queue from MAC processor 310-1 and then may dequeue a packet in a queue from MAC processor 310-2 stored in queue memory 410. After a packet is dequeued, packet processor 430 may process payload information contained in the packet. Packet processor 430 may prepare packets for transmission to Internet 150 (via firewall 140).

Packet inspection logic 440 may include may include logic that may examine packet contents to determine if, for example a packet contains session creation information. Packet inspection logic 440 may also contain hardware and/or software for discarding packets based on, for example, the determination of the packet contents.

Figure 5:
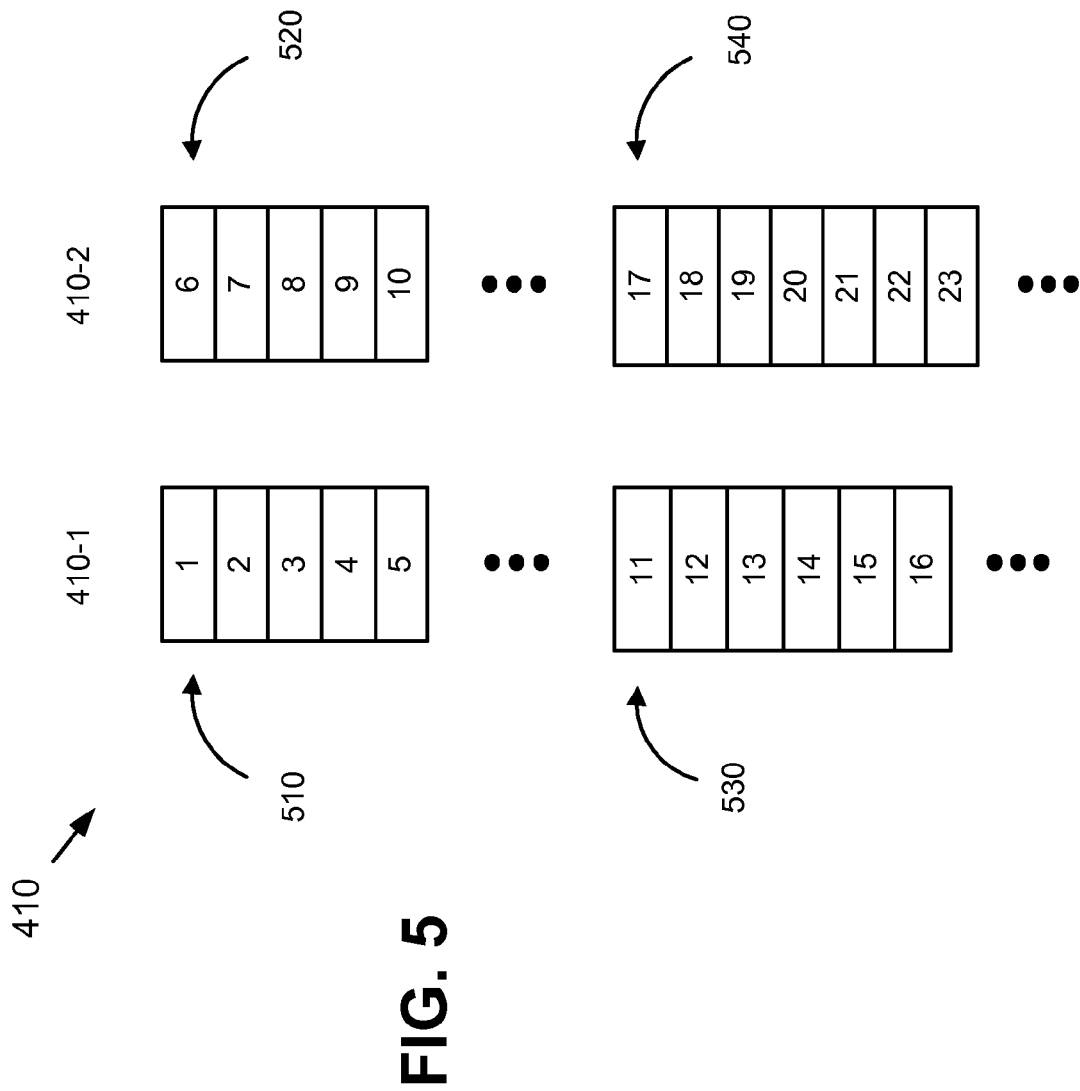
FIG. 5 shows exemplary queues received by a compute processor.

FIG. 5 shows exemplary groups of packets that may be received by compute processors 320 from MAC processors 310. For example, group of packets 510 and 530 may be received by compute processor 320-1 from MAC processor 310-1 and stored in queue 410-1. Group of packets 520 and 540 may be received by compute processor 320-1 from MAC processor 310-2 and stored in queue 410-2. Queues 410-1 and 410-2 may be contained in memory 410. Exemplary group of packets 510 may contain five packets of data, labeled 1-5 and group of packets 530 may contain six packets of data, labeled as 11-16. Exemplary group of packets 520 may contain five packets of data, labeled as 6-10 and exemplary group of packets 540 may contain seven packets of data, labeled as 17-23. The exemplary groups of packets received and stored in queues 410-1 and 410-2 may be processed as described below with reference to FIG. 6.

Exemplary Processing

Figure 6:
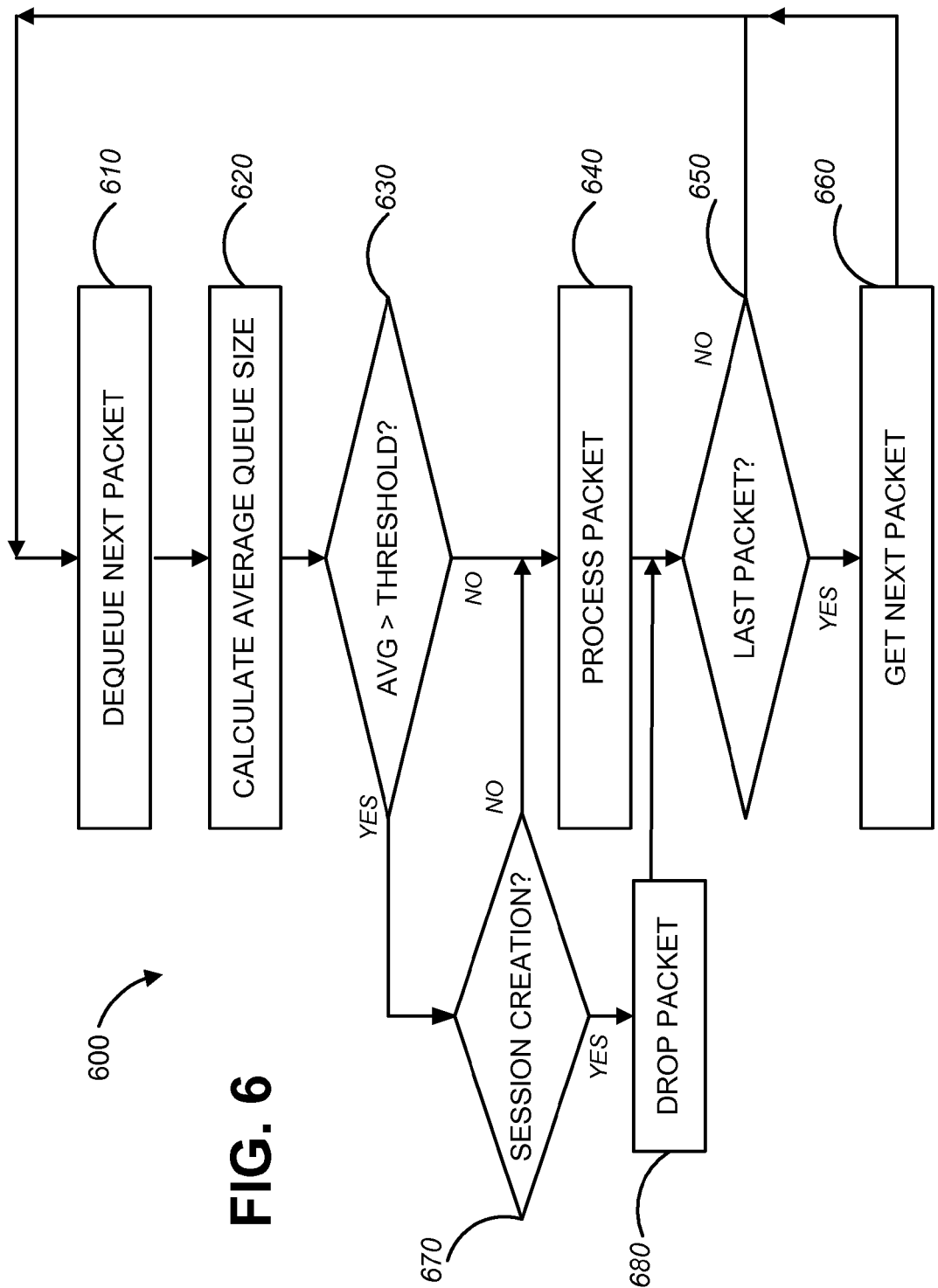
FIG. 6 is a flow diagram illustrating an exemplary process performed by a compute processor.

FIG. 6 is a flow diagram illustrating an exemplary early load detection process 600 performed by compute processor 320. Process 600 may be performed on two stored queues of packets, where a first queue is received from MAC processor 310-1 and a second queue is received from MAC processor 310-2. In the example shown in FIG. 5, for instance, the first queue may be queue 410-1 and the second queue may be queue 410-2. Process 600 may begin as a first packet is dequeued (act 610). Referring to FIG. 5, packet 1 contained in queue 410-1 may be dequeued. After dequeing packet 1, the average queue size may be calculated (act 620). For example, the remaining number of data packets in the first and second queues (410-1 and 410-2) may be determined and used in a formula to calculate the average queue size. For example, a current average queue size "$avg_c$" may be calculated from a previous average queue size "$avg_p$" using a formula such as:

$$avg_c = \lfloor (1-w) \times avg_p \rfloor + (w \times q) \quad (1)$$

where "q" may be the number of packets in the first and second queues remaining to be dequeued. The variable "w" may be considered as a "time constant" value of the queue filter logic 420, where "w" may be calculated from a formula such as:

$$H + 1 + \frac{(1-w)^{H+1} - 1}{w} \leq L \quad (2)$$

where L may be a low queue length value constant, such as 60% of a maximum queue size, and H may be a high queue length value constant, such as 90% of a maximum queue size, where an exemplary maximum queue size (the sum of both the first and second queues together) may be 128 packets. For example, H may be set to a value of 115 packets and L may be set to 76 packets. Using exemplary formula (2), a value of "w" may be obtained and "w" may then be used in exemplary formula (1), in order to calculate a current average queue size "$avg_c$".

For example, the four remaining packets contained in queue 410-1 (2-5), and the five packets contained in queue 410-2 (6-10), are a total of 9 packets after dequeing packet 1 of queue 410-1. Using w=0.1, q=9, $avg_p$=0, a current average may be calculated to be $avg_c$=0.9. The current average queue size value calculated in act 620 may then be compared to a stored threshold value (act 630). For example, the stored threshold value H may be compared to the calculated average value "$avg_c$" in queue filter logic 420. If it is determined in act 630 that the average queue size is not greater than the threshold value (NO), the packet may be processed (act 640). For example, the data contained in packet 1 may be processed by packet processor 430 and may be transmitted to Internet 150.

Each time a packet is dequeued in act 610 a current average queue size may be calculated using current values of q and $avg_p$ calculated in act 620. For example, after dequeing packet 1 of queue 410-1, the next packet that is dequeued is packet 6 of queue 410-2. Using w=0.1, q=8, $avg_p$=0.9, a current average queue size may be calculated to be $avg_c$=1.6. Continuing in this manner, the average queue sizes $avg_c$ calculated (in act 620) after dequeing packets 2, 7, 3, 8, 4, 9 and 5 may be 2.14, 2.53, 2.78, 2.90, 2.90, 2.81 and 2.63 respectively.

After processing a dequeued packet, it is determined if the processed packet is the last packet in a queue (act 650). For example, if packet 5 contained in queue 410-1 were processed, it may be determined that it is the last packet in a queue and a group of packets may then be received (act 660). For example, after processing packet 5 in queue 410-1, group of packets 530 may be received and stored into queue 410-1 of compute processor 320. In this example, packet 10 in queue 410-2 may then be dequeued in act 610. The number of packets remaining to be dequeued (in queues 410-1 and 410-2) may now be equal to 6, as the last packet (10) may be dequeued from queue 410-2 (leaving zero packets remaining) while 6 packets may be contained in the next group of packets received queue 410-1. Compute processor 320 may then use the determined value of w=0.1, the previous average queue size value $avg_p$=2.63 and q=6, to calculate an average queue size $avg_c$=2.97 in act 620, for example. If a processed packet is not determined to be a last packet in a queue, process 600 may continue to process the next packet by dequeing a next packet (act 610). Compute processor 320 may receive packets (based on hash values computed in MAC processor 310) in groups or individually. Compute processor 320 may also wait for packets to be received if a queue is empty, for example.

If the average queue size is determined to be greater than a threshold value (act 630) the packet is inspected to determine if it is a session creation packet (act 670). For example, if queue filter logic 420 determines that the calculated average queue size ($avg_c$) is greater than the threshold value (H), packet inspection logic 440 may inspect a packet to determine the contents. If the packet is determined to be a session creation packet, it may be dropped (act 680). If the packet is dropped, it is then determined if the packet is the last packet in a queue (act 650). If the dropped packet is determined to be the last packet in a queue (Yes), a next packet may be received (act 660).

If, for example, the packet is inspected by packet inspection logic 440 and not determined to be a session creation packet (act 670), the packet may then be processed (act 640). For example, packet processor 430 may process the packet contents and forward the packet to Internet 150. In this manner, even if a threshold value (H) has been exceeded, a packet may be processed if it is not determined to be a session creation packet, in order to ensure that existing data connections may not be interrupted.

Although process 600 may calculate an average queue size of the two queues (410-1 and 410-2), if the queue from one of the MAC processors 310 is empty, compute processor 320 may calculate the average queue size using only one queue. For example, packets from queue 410-2 (received from MAC processor 310-2) may be dequeued and if the queue from MAC processor 310-1 is empty (queue 410-1 contains no packets), the average queue size value may be calculated using the number of remaining packets in queue 410-2. Compute processor 320 may continue to dequeue packets and calculate average queue sizes using only one queue until packets may be received and stored in a second queue, for example.

In further embodiments, exemplary process 600 may also calculate an average queue size using three or more queues. For example, compute processor 320 may receive packets from three or more MAC processors 310, where packets received from each of the MAC processors 310 may be stored in queue memory 410. If, for example, an average queue size is calculated using three queues of packets, exemplary formulas (1) and (2) may be used as described above with appropriately scaled values of L and H. For example, when calculating an average queue size using three queues of packets, a value of L (60% of a maximum queue size) would be 115 packets and a value of H (90% of a maximum queue size) would be 173 packets, as calculated using a maximum queue size of 192 packets.

CONCLUSION

Implementations consistent with the principles of the embodiments provide methods and systems for early load detection in a compute processor. The foregoing description of exemplary embodiments provides illustration and description, but is not intended to be exhaustive or to limit the precise form disclosed. Modifications and variations are possible in light of the above teachings or may be acquired from practice of the embodiments.

Moreover, while series of acts have been described with regard to FIG. 6, the order of the acts may be varied in other implementations consistent with the principles of the embodiments. In addition, non-dependent acts may be implemented in parallel.

No element, act, or instruction used in the description of the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    storing, by a device, a first queue of packets and a second queue of packets,
        where the first queue of packets includes a first number of packets and the second queue of packets includes a second number of packets;
    dequeueing, by the device, a packet from the first queue of packets or the second queue of packets;
    calculating, by the device, an average queue size based on:
        a number of packets included in the first queue and included in the second queue after the packet has been dequeued from the first queue of packets or the second queue of packets,
        a previous average queue size based on a prior number of packets included in the first queue of packets and in the second queue of packets prior to the packet being dequeued, and
        a queue filter time constant;
    determining, by the device, whether the packet is a session creation packet when the calculated average queue size is greater than a threshold value,
        where determining whether the packet is a session creation packet comprises examining contents of the packet;
    discarding, by the device, the packet when the packet is determined to be a session creation packet and when the calculated average queue size is greater than the threshold value; and
    further processing, by the device, the packet when the calculated average queue size is greater than the threshold value and when the packet is determined not to be a session creation packet.

2. The method of claim 1 further comprising:
    comparing the calculated average queue size to the threshold value;
    determining that the calculated average queue size is less than the threshold value based on comparing the calculated average queue size to the threshold value; and
    transmitting the packet when the calculated average queue size is less than the threshold value.

3. The method of claim 2, where the threshold value is 90% of a maximum queue size, and
    where the maximum queue size is based on a sum of a maximum number of packets included in the first queue of packets and included in the second queue of packets.

4. The method of claim 1, where calculating an average queue size further comprises:
    determining the average queue size as $avg_c = \lfloor (1-w) \times avg_p \rfloor + (w \times q)$, where q is the number of packets remaining in the first queue and the second queue after the packet has been dequeued from the first queue or the second queue, $avg_p$ is the previous average queue size, and w is the queue filter time constant.

5. A network device comprising:
    a queue memory to store a first queue of packets received from a first media access control (MAC) processor and a second queue of packets received from a second media access control (MAC) processor; and
    logic to:
        dequeue a packet from the first queue of packets,
        calculate an average queue size based on:
            a number of remaining packets in the first queue of packets and the second queue of packets after the packet has been dequeued,
            a previous average queue size based on a previous number of packets remaining in the first queue of packets and the second queue of packets prior to the packet being dequeued, and
            a queue filter time constant,
        compare the calculated average queue size to a threshold,
        examine content of the dequeued packet when the calculated average queue size is greater than the threshold,
        determine, based on the examined content, whether the dequeued packet is a session creation packet, discard the dequeued packet when the calculated average queue size is greater than the threshold and when the dequeued packet is a session creation packet, and further process the dequeued packet when the calculated average queue size is greater than the threshold and when the dequeued packet is not a session creation packet, where, when further processing the dequeued packet, the logic is further to:

process payload information contained in the packet, and prepare the dequeued packet for transmission to a network when the payload information has been processed.

6. The network device of claim 5, where the logic is further to:

determine whether the dequeued packet is a last packet in the first queue of packets, and receive one or more packets for the first queue of packets when the dequeued packet is the last packet.

7. A method comprising:

storing, by a device, two queues of packets in a memory associated with the device;

dequeueing, by the device, a packet from one of the two queues of packets;

calculating, by the device, an average queue size of the two queues based on a number of packets remaining in the two queues of packets after dequeueing the packet from the one of the two queues of packets, a previous average queue size based on a previous number of packets remaining in the two queues of packets prior to the packet being dequeued, and a queue filter time constant;

comparing, by the device, the calculated average queue size to a threshold value;

determining, by the device and based on a result of comparing the calculated average queue size to the threshold value, whether the dequeued packet is a session creation packet;

discarding, by the device, the dequeued packet when the calculated average queue size exceeds the threshold value and when the dequeued packet is a session creation packet, and further processing, by the device, the dequeued packet when the calculated average queue size exceeds the threshold value and when the dequeued packet is not a session creation packet.

8. The method of claim 7, where the threshold value is 90% of a maximum queue size of the two queues.

9. The method of claim 7, where calculating the average queues size further comprises:

calculating the average queue size as $avg_c = \lfloor (1-w) \times avg_p \rfloor + (w \times q)$, where q is the number of packets remaining in the two queues after dequeueing the packet, $avg_p$ is the previous average queue size based on a previous number of packets remaining in the two queues prior to dequeueing the packet, and w is the queue filter time constant; and calculating w based on $$H + 1 + \frac{(1-w)^{H+1} - 1}{w} \le L,$$

where H is a high threshold value and L is a low threshold value.

10. The method of claim 9, where H is 90% of a maximum queue size of the two queues.

11. The method of claim 9, where L is 60% of a maximum queue size of the two queues.

12. A network device comprising:

a plurality of processors, where each of the processors is to:

receive and store a first queue of packets from a first media access control (MAC) processor;

receive and store a second queue of packets from a second MAC processor;

dequeue a packet from the first queue of packets or the second queue of packets;

calculate an average queue size based on:

a number of remaining packets in the first queue of packets and second queue of packets after the packet has been dequeued, a previous average queue size prior to the packet being dequeued, and a queue filter time constant;

compare the calculated average queue size to a threshold;

determine, based on a result of comparing the calculated average queue size to the threshold, whether the dequeued packet is a session creation packet;

further process the dequeued packet when based on the calculated average queue size is greater than the threshold and whether the dequeued packet is not a session creation packet, and discard the dequeued packet when the calculated average queue size is greater than the threshold and when the dequeued packet is a session creation packet.

13. The network device of claim 12, the plurality of processors are further to:

determine that the calculated average queue size is less than the threshold, process the dequeued packet when the calculated average queue size is less than the threshold, prior to determining whether the dequeued packet is a session creation packet, where the plurality of processors are to determine whether the dequeued packet is a session creation packet when the calculated average queue size is greater than the threshold.

14. The network device of claim 12, where, when calculating an average queue size, the plurality of processors are further to:

calculate, after each packet is dequeued from the first queue of packets or the second queue of packets, a current average queue size, and determine whether to process or discard each dequeued packet based on the respective calculated current average queue sizes.

15. The network device of claim 12, where, when dequeueing a packet, the plurality of processors are further to:

select the packet to be dequeued by alternating between the first queue of packets and the second queue of packets.

16. A method comprising:

storing, by a device, three or more queues of packets in a memory associated with the device;

dequeueing, by the device, a packet from one of the three or more queues;

calculating, by the device, an average queue size based on:

a number of packets in the three or more queues after dequeueing the packet from the one of the three or more queues, a previous average queue size prior to dequeueing the packet from the one of the three or more queues, and a queue filter time constant;

comparing, by the device, the calculated average queue size to a threshold value;

examining, by the device, contents of the packet to determine whether the packet contains session creation information, when the calculated average queue size is greater than the threshold value; and discarding, by the device, the packet when the packet is determined to contain session creation information and the calculated average queue size is greater than the threshold value; and transmitting, by the device, the packet when the packet is determined to not contain session creation information and the calculated average queue size is greater than the threshold value.

17. The method of claim 16, where calculating the average queue size comprises:

determining that a first one, of the three or more queues, is not empty and that other ones, of the three or more queues, are empty; and calculating the average queue size further based only on a number of packets in the first one, of the three or more queues, when the other ones, of the three or more queues, are empty.

18. The method of claim 16, further comprising:

dequeueing a packet from a particular queue, of the three or more queues;

determining whether the dequeued packet, from the particular queue, is a last packet in the particular queue; and receiving at least one additional packet at the particular queue when the dequeued packet from the particular queue is the last packet in the particular queue.

19. The method of claim 18, further comprising:

dequeueing another packet from the particular queue when the dequeued packet, from the particular queue, is not the last packet in the particular queue; and calculating another average queue size based on:

a number of packets in the three or more queues after dequeueing the other packet and, the calculated average queue size.

20. The method of claim 16, further comprising:

transmitting the packet when the calculated average queue size is not greater than a threshold value, where the contents of the packet are not examined when the calculated average queue size is not greater than a threshold value.

21. The network device of claim 12, where the plurality of processors are further to:

dequeue another packet from the first queue of packets or the second queue of packets when the dequeued packet is a last packet in the first queue of packets or the second queue of packets; and receiving another packet when the dequeued packet is not the last packet in the first queue of packets or the second queue of packets.

22. The network device of claim 5, where the logic is further to:

process the dequeued packet when the calculated average queue size is not greater than the threshold, where the logic is to not examine the contents of the dequeued packet when the calculated average queue size is not greater than the threshold.

23. The method of claim 5, further comprising:

processing the packet when the calculated average queue size is not greater than the threshold.

* * * * *

UNITED STATES PATENT AND TRADEMARK OFFICE
CERTIFICATE OF CORRECTION

| | | |
|---|---|---|
| PATENT NO. | : 8,036,124 B1 | Page 1 of 1 |
| APPLICATION NO. | : 11/673236 | |
| DATED | : October 11, 2011 | |
| INVENTOR(S) | : Girish Motwani | |

It is certified that error appears in the above-identified patent and that said Letters Patent is hereby corrected as shown below:

Claim 2 (column 8, line 24), after "The method of claim 1" insert -- , --;

Claim 7 (column 9, line 29), after "queues based on" insert -- : --;
Claim 7 (column 9, line 45), after "packet" delete -- , -- and insert -- ; --;

Claim 12 (column 10, line 24), after "dequeued packet when" delete "based on";
Claim 12 (column 10, line 26), after "old and" delete "whether";
Claim 12 (column 10, line 27), after "packet" delete -- , -- and insert -- ; --;

Claim 18 (column 11, line 32), after "packet" insert -- , --;
Claim 18 (column 11, line 33), after "queue" (first occurrence) insert -- , --.

Signed and Sealed this
Twentieth Day of December, 2011

David J. Kappos
*Director of the United States Patent and Trademark Office*